United States Patent
Lee et al.

(10) Patent No.: US 11,476,727 B2
(45) Date of Patent: Oct. 18, 2022

(54) TRANSMITTER APPARATUS AND TRANSMISSION METHOD FOR A WIRELESS POWER TRANSMISSION SYSTEM PROVIDING IMPROVED WIRELESS POWER TRANSMISSION EFFICIENCY

(71) Applicant: INDUSTRY-ACADEMIC COOPERATION FOUNDATION, YONSEI UNIVERSITY, Seoul (KR)

(72) Inventors: Chung Yong Lee, Seoul (KR); Chae Hun Im, Seoul (KR); Sang Won Jung, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 17/359,931

(22) Filed: Jun. 28, 2021

(65) Prior Publication Data
US 2022/0045557 A1  Feb. 10, 2022

(30) Foreign Application Priority Data
Aug. 4, 2020 (KR) .................. 10-2020-0097321

(51) Int. Cl.
*H02J 50/90* (2016.01)
*H02J 50/40* (2016.01)
(Continued)

(52) U.S. Cl.
CPC ........... *H02J 50/90* (2016.02); *H02J 50/001* (2020.01); *H02J 50/20* (2016.02); *H02J 50/402* (2020.01); *H02J 50/80* (2016.02)

(58) Field of Classification Search
None
See application file for complete search history.

(56) References Cited

U.S. PATENT DOCUMENTS

| 2016/0099757 | A1* | 4/2016 | Leabman | H02J 50/402 |
| | | | | 307/104 |
| 2017/0179766 | A1* | 6/2017 | Zeine | H02J 50/80 |
| 2018/0226840 | A1* | 8/2018 | Leabman | H02J 50/20 |

FOREIGN PATENT DOCUMENTS

| KR | 101735145 B1 | 9/2014 |
| KR | 10-2014-0124706 A | 10/2014 |

(Continued)

OTHER PUBLICATIONS

Dong, Guannan, et al. "Achievable rate optimization for massive MIMO enabled SWIPT systems over downlink Rician channels." Digital Object Identifier 10.1109/ IEEE Access vol. 6 (2018): 36810-36824.

*Primary Examiner* — Jared Fureman
*Assistant Examiner* — Joel Barnett

(57) ABSTRACT

A wireless power transmission system includes a receiver position identifier unit configured to determine the positions of receiver apparatuses; a signal transmitter unit comprising antennas arrayed in a pre-designated pattern and configured to radiate wireless power signals by forming a beam in a pattern corresponding to signals supplied respectively to the antennas; and a beamforming unit configured to improve a wireless power transmission efficiency by temporarily setting a frequency vector, which is for designating frequencies of the signals supplied to the antennas, and a beamforming vector, which is for designating phases and gains of the signals, based on the positions of the receiver apparatuses and alternatingly iteratively estimating the other vector to enhance power transmission efficiency such that a multi-lobe beam pattern radiated simultaneously in the directions of the receiver apparatuses is formed in the antennas.

12 Claims, 6 Drawing Sheets

(51) Int. Cl.
*H02J 50/20* (2016.01)
*H02J 50/00* (2016.01)
*H02J 50/80* (2016.01)

(56) References Cited

FOREIGN PATENT DOCUMENTS

| | | |
|---|---|---|
| KR | 10-2017-0100649 A | 9/2017 |
| KR | 10-2019-0028994 A | 3/2019 |
| KR | 10-2020-0065537 A | 6/2020 |

* cited by examiner

TRANSMITTER APPARATUS AND TRANSMISSION METHOD FOR A WIRELESS POWER TRANSMISSION SYSTEM PROVIDING IMPROVED WIRELESS POWER TRANSMISSION EFFICIENCY

CROSS-REFERENCE TO RELATED APPLICATIONS

This application claims priority to Korean Patent Application No. 10-2020-0097321, filed with the Korean Intellectual Property Office on Aug. 4, 2020, the disclosure of which is incorporated herein by reference in its entirety.

BACKGROUND

1. Technical Field

The present disclosure relates to a transmitter apparatus and a transmission method for a wireless power transmission system, more particularly to a transmitter apparatus and transmission method for a wireless power transmission system that can improve the efficiency of the wireless power transmission in an environment for transmitting wireless power signals to multiple receiver apparatuses.

2. Description of the Related Art

With recent advances in wireless network technology, there is a rapid growth in the numbers of IoT (Internet of Things) devices. In order to effectively manage a large-scale wireless network, there is a need for a system capable of supplying power to the IoT devices in a stable manner.

In this regard, there is much attention being focused on the wireless power transmission (WPT) system based on RF (radio frequency) signals. In particular, there is active research under way on beamforming technology, especially in regard to spatially concentrating energy by using a multi-antenna solution, as a way of increasing the efficiency of wireless power transmission.

However, in an environment where power is required by multiple receiver devices, it may not be easy to maximize wireless power transmission efficiency.

FIG. 1 illustrates an example of a wireless power signal transmission system.

FIG. 2 illustrates an example of a beam pattern of a wireless power signal provided according to a conventional beamforming technique.

FIG. 1 illustrates an example of a wireless power transmission system that includes a transmitter apparatus Tx, which is equipped with an N number of antennas, and a K number of receiver apparatuses Rx, each of which is installed with a single antenna and which are located within the pre-designated service area of the transmitter apparatus Tx. To improve the efficiency of the wireless power transmission in such an environment, the transmitter apparatus Tx using a conventional beamforming technique may perform wireless power transmission with the beams formed in the direction of the closest receiver apparatus Rx from among K number of receiver apparatuses Rx requiring wireless power signals, as illustrated in FIG. 2.

FIG. 2 illustrates a beam pattern formed according to a conventional beamforming technique when three receiver apparatuses, i.e. a first to a third receiver apparatus Rx1~Rx3, are arranged at increasingly greater distances in different directions from the transmitter apparatus Tx. FIG. 2 illustrates the intensities of the wireless power transmitted to the first to third receiver apparatuses Rx1~Rx3 normalized with respect to the magnitude of the wireless power transmitted to the first receiver apparatus Rx1.

As illustrated in FIG. 2, the conventional beamforming technique forms the beam pattern in the direction of the first receiver apparatus Rx1, i.e. the closest among the first to third receiver apparatuses Rx1~Rx3, in order to improve wireless power transmission efficiency. As a result, power may be transmitted in an optimized manner for the first receiver apparatus Rx1 only, and the power transmitted to the other receiver apparatuses Rx2, Rx3 may be greatly reduced.

The beam pattern shown in FIG. 2 with a lobe symmetrical about the 90 degree orientation to the lobe reaching the first receiver apparatus Rx1 is obtained from a simulation in which it is assumed that the transmitter apparatus Tx is structured to have multiple antennas arrayed linearly. That is, as illustrated in FIG. 2, in a wireless power transmission system where there are multiple receiver apparatuses arranged, the transmitter apparatus Tx may form the beam pattern in the direction of the receiver apparatus Rx1 located at the closest distance when power signals are transmitted using a conventional beamforming technique with the greatest emphasis placed on wireless power transmission efficiency. This is because the conventional beamforming technique based on wireless power transmission efficiency involves forming the beam by adjusting only the phase and gain and cannot form a multi-lobe beam pattern that radiates power in several directions simultaneously. If a transmitter apparatus Tx can be made to form a multi-lobe beam pattern, it would be possible to further improve the efficiency of wireless power transmission in a multi-user environment.

SUMMARY

An objective of the present disclosure is to provide a transmitter apparatus and a transmission method for a wireless power transmission system that can maximize wireless power transmission efficiency in a wireless power transmission system in which multiple receiver apparatuses are arranged.

Another objective of the present disclosure is to provide a transmitter apparatus and a transmission method for a wireless power transmission system that can set a frequency and beamforming vector for signals supplied to the antennas in a way that maximizes the wireless power transmission efficiency of a transmitter apparatus having a multiple number of antennas. To achieve the objectives above, an embodiment of the present disclosure provides a transmitter apparatus for a wireless power transmission system that includes: a receiver position identifier unit configured to determine positions of a multiple number of receiver apparatuses; a signal transmitter unit comprising a multiple number of antennas arrayed in a pre-designated pattern and configured to radiate wireless power signals by forming a beam in a pattern corresponding to signals supplied respectively to the multiple antennas; and a beamforming unit configured to improve a wireless power transmission efficiency by temporarily setting a frequency vector, which is for designating frequencies of the signals supplied to the multiple antennas, and a beamforming vector, which is for designating phases and gains of the signals, based on the positions of the multiple receiver apparatuses and alternatingly iteratively estimating the other vector to enhance power transmission efficiency such that a multi-lobe beam pattern radiated simultaneously in the directions of the multiple receiver apparatuses is formed in the multiple antennas.

If the change in total harvested energy, which may be calculated as the total sum of harvested energy amounts harvested respectively at the multiple receiver apparatuses according to a temporary frequency vector and a temporary beamforming vector set temporarily through an alternating iterative estimation, is within a pre-designated reference harvested energy difference, then the beamforming unit can adjust the frequencies and the phases and gains of the signals supplied to the multiple antennas according to the currently set temporary frequency vector and temporary beamforming vector.

Upon obtaining a temporary frequency vector, the beamforming unit can calculate a downlink channel between the transmitter apparatus and each of the multiple receiver apparatuses and can calculate the temporary beamforming vector based on the calculated downlink channels and energy conversion efficiencies of the multiple receiver apparatuses.

The beamforming unit can calculate a LOS (line-of-sight) component of a downlink channel ($h_k$) between the transmitter apparatus and a k-th receiver apparatus from among the multiple receiver apparatuses according to the following equation:

$$\bar{h}_k = \sqrt{\frac{1}{N}} \left[ 1, e^{j2\pi(f_2\tau_{k,2} - f_1\tau_{k,1})}, \ldots, e^{j2\pi(f_N\tau_{k,N} - f_1\tau_{k,1})} \right]^T,$$

where $f_n$ represents a frequency of a signal supplied to an n-th antenna from among an N number of antennas, and $\tau_{k,n}$ represents a time delay between the n-th antenna and a k-th receiver apparatus, and can calculate the downlink channel ($h_k$) as:

$$h_k = \sqrt{\frac{\beta_k R}{1+R}} \bar{h}_k + \sqrt{\frac{\beta_k}{1+R}} \tilde{h}_k,$$

where $\beta_k$ represents a large-scale fading coefficient, R represents a Rician parameter, and $\tilde{h}_k$ represents a NLOS (non-line-of-sight) component.

The beamforming unit can calculate the temporary beamforming vector according to the following equation:

$$w = \sqrt{P_0}\, v_{max}(G),$$

where $P_0$ represents a maximum transmission power, G represents an energy conversion and channel efficiency and is calculated as $G = \sum_{k=1}^{K} \eta_k h_k h_k^H$, and $v_{max}(G)$ represents an eigenvector corresponding to a maximum of the energy conversion and channel efficiency (G).

The beamforming unit, upon obtaining the temporary beamforming vector, can search for and obtain a frequency ($f_n$) maximizing the energy conversion and beamforming channel efficiency (g(f)) within a pre-designated frequency range ([$f_L$, $f_U$]) according to the following equation:

$$\underset{f}{\text{maximize}}\, g(f) = w^H G w$$

$$\text{subject to } f_L \le f_n \le f_U,\, \forall\, n.$$

The beamforming unit can calculate and obtain an iteratively estimated frequency vector ($f^{(t+1)}$) according to the following equation:

$$f^{(t+1)} = \mathcal{P}(f^{(t)} - M_t^{-1} q_t),$$

where $f^{(t+1)}$ represents the iterative frequency vector contacting an objective function (g(f)) at a (t+1)-th iteration, and P(•) represents an operator for orthogonally projecting elements of the iterative frequency vector ($f^{(t+1)}$) to within the frequency range ([$f_L$, $f_U$]), so as to maximize a surrogate function ($J_t(f)$) expressed as:

$$J_t(f) = -\frac{1}{2}(f - f^{(t)})^T M_t(f - f^{(t)}) - q_t^T(f - f^{(t)}) + g(f^{(t)}),$$

where f is a current temporarily set frequency vector, $f^{(t)}$ represents an iterative frequency vector corresponding to the objective function (g(f)) at a t-th iteration, $M_t$ represents a matrix coefficient expressing a second-order term, and $q_t$ represents a vector coefficient expressing a first-order term.

The beamforming unit can iteratively obtain an iterative frequency vector until the difference between the iterative frequency vector obtained at the current iteration and the iterative frequency vector obtained at the previous iteration is within a pre-designated reference frequency difference ($\varepsilon$) and, if the difference between the iterative frequency vectors is within the reference frequency difference ($\varepsilon$), can set the currently obtained iterative frequency vector as the temporary frequency vector.

The beamforming unit can calculate the amount of harvested energy at each of the multiple receiver apparatuses according to the following equation:

$$Q_k = \eta_k \mathbb{E}\{|y_k|\}^2 = \eta_k(|h_k^H w|^2 + \sigma_k^2),$$

where $Q_k$ represents the amount of harvested energy at a k-th receiver apparatus, $\eta_k$ represents the rectifier energy conversion efficiency of the receiver apparatus, $\mathbb{E}$ represents an energy function, $h_k^H$ represents an Hermitian matrix of the downlink channel between the transmitter apparatus and the k-th receiver apparatus, w represents the beamforming vector, and $\sigma_k^2$ represents the variance of antenna noise $n_k$.

Another embodiment of the present disclosure, conceived to achieve the objectives above, provides a transmission method for the transmitter apparatus of a wireless power transmission system that includes a multiple number of antennas arrayed in a pre-designated pattern and is configured to apply beamforming on wireless power signals and transmit the wireless power signals to a multiple number of receiver apparatuses, where the transmission method includes: determining the positions of the multiple receiver apparatuses; estimating a frequency vector, which is for designating the frequencies of the signals supplied to the multiple antennas, and a beamforming vector, which is for designating the phases and gains of the signals, by temporarily setting the frequency vector and the beamforming vector based on the positions of the multiple receiver apparatuses and alternatingly iteratively estimating the other vector to enhance power transmission efficiency such that a multi-lobe beam pattern radiated simultaneously in directions of the multiple receiver apparatuses is formed in the multiple antennas; and radiating the wireless power signals by forming a beam in a pattern according to signals supplied respectively to the multiple antennas in correspondence to the estimated beamforming vector and frequency vector.

Thus, a transmitter apparatus and a transmission method for a wireless power transmission system according to an embodiment of the present disclosure can provide maximum transmission efficiency in transmitting wireless power signals with multi-lobe beamforming towards multiple receiver apparatuses from a transmitter apparatuses having a multiple number of antennas by adjusting the beamforming vector, which is for adjusting the gains and phases of the signals supplied to the multiple antennas, and the frequency vector, which is for adjusting the frequencies of the signals supplied to the multiple antennas, according to the positions of the multiple receiver apparatuses waiting to receive the wireless power signals.

DETAILED DESCRIPTION

Figure 1:
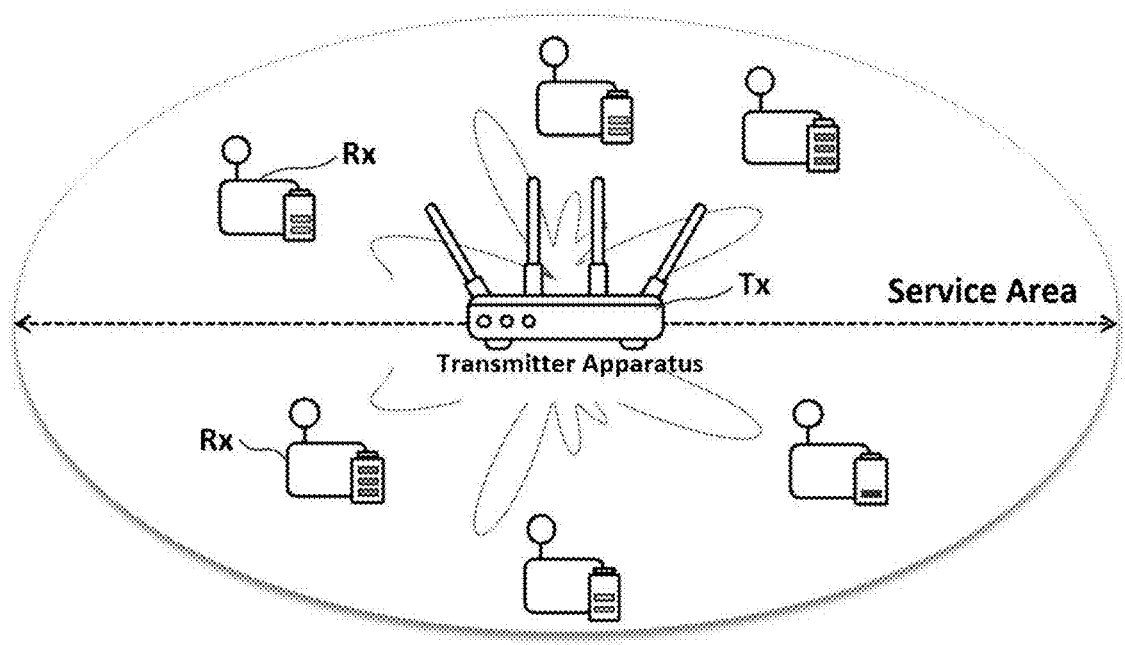
FIG. 1 illustrates an example of a wireless power signal transmission system.

To sufficiently understand the present disclosure, the advantages provided by operation of the present disclosure, and the objectives achieved by practice of the present disclosure, it may be necessary to reference the appended drawings, which illustrate preferred embodiments of the present disclosure, as well as the descriptions associated with the appended drawings.

Below, a detailed description of the present disclosure is provided, through a detailed description of preferred embodiments that reference the accompanying drawings. However, the present disclosure can be implemented in many different forms and is not limited to the embodiments described herein. For a clear description of the present disclosure, certain portions that are not of great relevance to the descriptions have been omitted, and like reference numerals have been assigned to like components in the drawings.

Throughout the specification, mention of a part "including" a certain component does not preclude the possibility of other components being present, unless specifically stated otherwise, but rather means that other components can be included additionally. Also, terms such as "unit", "device", "module", "block", etc., refer to a unit for processing at least one function or action, where the unit can be implemented as hardware, software, or a combination of hardware and software.

Figure 3:
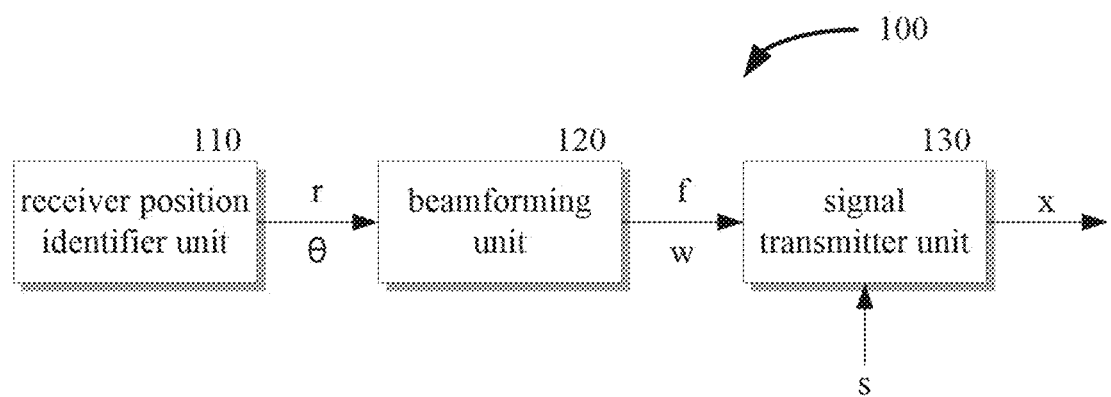
FIG. 3 illustrates a transmitter apparatus in a wireless power transmission system according to an embodiment of the present disclosure.
Figure 4:
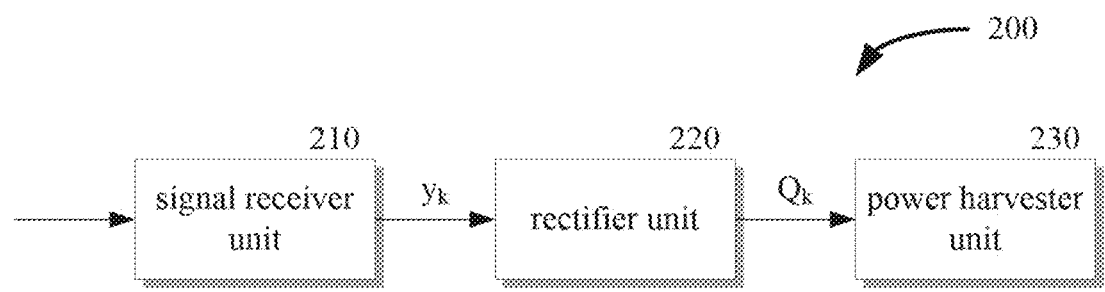
FIG. 4 illustrates a receiver apparatus in a wireless power transmission system according to an embodiment of the present disclosure.

FIG. 3 illustrates an example of a transmitter apparatus in a multi-user environment according to an embodiment of the present disclosure, and FIG. 4 illustrates a receiver apparatus in a multi-user environment according to an embodiment of the present disclosure.

Referring to FIG. 3, a transmitter apparatus 100 according to this embodiment can include a receiver position identifier unit 110, a beamforming unit 120, and a signal transmitter unit 130. The receiver position identifier unit 110 may identify the positions of multiple receiver apparatuses that are arranged within the service area and require transmissions of wireless power signals. The receiver position identifier unit 110 may obtain the distances (r) and angles (θ) at which the receiver apparatuses are arranged from the multiple identified receiver apparatuses.

Here, the receiver position identifier unit 110 can communicate with each of the multiple receiver apparatuses to identify the position of each receiver apparatus. However, in cases where the receiver apparatuses are IoT devices, the receiver position identifier unit 110 can obtain and store the positions of multiple receiver apparatuses beforehand, since most of the receiver apparatuses may be fixed at pre-designated positions without movement.

The beamforming unit 120 may, based on the distances (r) and orientation angles (θ) of the multiple receiver apparatuses obtained at the receiver position identifier unit 110, set a frequency vector (f) and a beamforming vector (w) for a wireless power signal that can maximize the transmission efficiency of the wireless power signal. Here, the frequency vector (f) may be a vector that includes as its elements the frequencies corresponding respectively to a multiple number of transmitter antennas of the transmitter apparatus 100. In other words, the frequency vector (f) may be a vector in which the elements are frequencies of a number corresponding to the number of transmitter antennas. The beamforming vector (w) may be a vector that sets the phase and gain of signals applied to each antenna such that a multi-lobe beam is formed that proceeds in the directions of the multiple receiver apparatuses from the multiple antennas.

Here, the method by which the beamforming unit 120 obtains the frequency vector (f) and the beamforming vector (w) will be described later on in further detail.

The signal transmitter unit 130 may include a multiple number of transmitter antennas (an N number of transmitter antennas is used here as an example) and may radiate a power signal (x) with a multi-lobe beam formed in the directions of the multiple receiver apparatuses by adjusting the signals having corresponding frequencies in the frequency vector (f) according to the phase and gain set by the beamforming vector (w), as set by the beamforming unit 120, for each of the multiple transmitter antennas.

Here, the power signal (x) transmitted from the signal transmitter unit 130 can be expressed as Equation 1.

$$x = ws, \qquad \text{[Equation 1]}$$

where s represents a signal which has a frequency corresponding to the frequency vector (f) and which follows a complex normal distribution.

When a multi-lobe beam is formed by the transmitter apparatus 100 illustrated in FIG. 3 and a transmission signal (x) is emitted, each of the multiple receiver apparatuses 200 may receive a reception signal ($y_k$), which is the transmission signal (x) transferred via a channel (h), to harvest power.

Referring to FIG. 4, each of the multiple receiver apparatuses 200 can include a signal receiver unit 210, a rectifier unit 220, and a power harvester unit 230.

The signal receiver unit 210 may obtain the reception signal ($y_k$) transferred via a channel (h) through a single antenna.

Generally, the wireless channel (h) between the transmitter apparatus 100 and a k-th receiver apparatus, from among the multiple number of receiver apparatuses, can be expressed as Equation 2 by applying the Rician channel model.

$$h_k = \sqrt{\frac{\beta_k R}{1+R}} \bar{h}_k + \sqrt{\frac{\beta_k}{1+R}} \tilde{h}_k, \quad \text{[Equation 2]}$$

where $h_k$ represents the downlink channel for the k-th receiver apparatus, $\beta_k$ represents a large-scale fading coefficient, R represents the Rician parameter, $\bar{h}_k$ represents the LOS (line-of-sight) component, and $\tilde{h}_k$ represents the NLOS (non-line-of-sight) component, which follows a complex Gaussian distribution having a mean vector of 0 and a covariance matrix of $$\frac{1}{N} I.$$

If a signal transmitter unit 130 having an N number of linearly arrayed transmitter antennas sends a transmission signal (x) having a single frequency ($f_0$) component from the transmitter apparatus 100, the LOS component ($\bar{h}_k$) of the downlink channel ($h_k$) may be determined by Equation 3.

$$\bar{h}_k = \sqrt{\frac{1}{N}} \left[ 1, e^{-j2\pi f_0 d\theta_k/C}, \ldots, e^{-j2\pi f_0 d(N-1)\theta_k/C} \right]_T, \quad \text{[Equation 3]}$$

where $j=\sqrt{-1}$, $f_0$ represents the center frequency of the transmission signal, d represents the antenna distance, $\theta_k$ represents the orientation angle of the k-th receiver apparatus, and C represents the speed of light.

However, in this embodiment, since the signal transmitter unit 130 of the transmitter apparatus 100 can designate signals individually for each of the N transmitter antennas according to the frequency vector (f) set by the beamforming unit 120, the LOS component ($\bar{h}_k$) of the downlink channel ($h_k$) can be expressed as Equation 4.

$$\bar{h}_k = \sqrt{\frac{1}{N}} \left[ 1, e^{j2\pi(f_2 \tau_{k,2} - f_1 \tau_{k,1})}, \ldots, e^{j2\pi(f_N \tau_{k,N} - f_1 \tau_{k,1})} \right]_T, \quad \text{[Equation 4]}$$

where $f_n$ represents the transmission frequency of the n-th transmitter antenna from among the N number of transmitter antennas, and $\tau_{k,n}$ represents the time delay between the n-th transmitter antenna and the k-th receiver apparatus.

Therefore, the reception signal ($y_k$) received at the signal receiver unit 210 of the k-th receiver apparatus 200 can be expressed as Equation 5.

$$y_k = h_k^H x + n_k \quad \text{[Equation 5]}$$

where $n_k$ represents antenna noise, which follows a Gaussian distribution having a mean of 0 and a variance of $\sigma_k^2$, and $h_k^H$ represents an Hermitian matrix of the downlink channel ($h_k$).

The rectifier unit 220 may rectify the reception signal ($y_k$) received at the signal receiver unit 210 to convert it to a direct current signal, and the power harvester unit 230 may harvest and store the power of the direct current signal converted at the rectifier unit 220. Here, the amount of energy ($Q_k$) harvested and stored in the power harvester unit 230 can be calculated as Equation 6.

$$Q_k = \eta_k \mathbb{E}\{|y_k|\}^2 = \eta_k \left( |h_k^H w|^2 + \sigma_k^2 \right), \quad \text{[Equation 6]}$$

where $\eta_k$ represents the energy conversion efficiency of the rectifier unit 220, and $\mathbb{E}$ represents an energy function.

In a wireless power transmission system that includes the transmitter apparatus and the multiple receiver apparatuses illustrated in FIG. 3 and FIG. 4, maximizing the wireless transmission efficiency may involve maximizing the total sum ($\Sigma Q_k$) of the energy amounts ($Q_1 \sim Q_K$) harvested by the multiple receiver apparatuses.

In this embodiment, the transmitter apparatus 100 can form an adaptive beam pattern that corresponds to the positions of multiple receiver apparatuses by simultaneously controlling the frequency vector (f) and the beamforming vector (w) such that the power transmission efficiency is maximized.

The following provides a description of the procedure by which the beamforming unit 120 of the transmitter apparatus 100 sets the frequency vector (f) and beamforming vector (w) such that the power transmission efficiency is maximized.

An objective function for setting the frequency vector (f) and the beamforming vector (w) such that the power transmission efficiency is maximized can be expressed as Equation 7.

$$\begin{aligned} & \underset{w,f}{\text{maximize}} && \sum_{k=1}^{K} Q_k(w, f) \\ & \text{subject to} && w^H w \leq P_0, \\ & && f_L \leq f_n \leq f_U, \forall n, \end{aligned} \quad \text{[Equation 7]}$$

where $P_0$ represents the maximum transmission power, $f_L$ represents the lower limit of the transmission frequency range, and $f_U$ represents the upper limit of the transmission frequency range.

Thus, if the beamforming unit 120 extracts the frequency vector (f) and the beamforming vector (w) that satisfy Equation 7, the power transmission efficiency can be maximized in the wireless power transmission system. However, Equation 7 is a non-convex optimization problem in which two variables of the frequency vector (f) and the beamforming vector (w) are combined, and as such, it may be very difficult to find the optimal solution to Equation 7.

Therefore, instead of calculating the solutions for the two variables simultaneously, this embodiment may obtain the optimal solution by a cross-iteration of temporarily setting one variable from between the frequency vector (f) and the beamforming vector (w) first and determining the other variable based on the one set variable.

In this embodiment, the frequency vector (f) may first be set temporarily to an initial frequency vector ($f^{(0)}$), and an initial beamforming vector ($w^{(0)}$) may be obtained according to Equation 8. Here, the initial frequency vector ($f^{(0)}$) can be set using a median value between the lower limit frequency ($f_L$) and the upper limit frequency ($f_U$) within the pre-designated frequency range but can also be set to an arbitrary value within the pre-designated frequency range.

$$w = \sqrt{P_0}\, v_{max}(G), \qquad \text{[Equation 8]}$$

where $G = \sum_{k=1}^{K} \eta_k h_k h_k^H$ represents the energy conversion and channel efficiency, and $v_{max}(G)$ represents an eigenvector corresponding to the maximum eigenvalue within matrix G.

When the initial beamforming vector ($w^{(0)}$) is obtained according to Equation 8, a solution to the objective function (g(f)) of Equation 9, which searches for the optimal frequency vector (f), may again be extracted based on the obtained initial beamforming vector ($w^{(0)}$), thereby solving the optimization problem for the frequency vector (f).

$$\underset{f}{\text{maximize}}\ \ g(f) = w^H G w \qquad \text{[Equation 9]}$$
$$\text{subject to}\ \ f_L \leq f_n \leq f_U,\ \forall n$$

The objective function (g(f)) of Equation 9 can be regarded as being associated with the energy conversion and beamforming channel efficiency, which represents the ratio between the power of the transmitted wireless signal and the power harvested at the receiver apparatus, when a beamformed wireless power signal is transmitted via a channel ($h_k$) to a receiver apparatus having a designated energy conversion efficiency ($\eta_k$).

However, the objective function g(f) of Equation 9 also has a non-convex form with respect to the frequency vector (f). Therefore, to solve Equation 9, the objective function (g(f)) may be iteratively substituted by a surrogate function ($J_t(f)$) that is expressed as a quadratic equation of a convex form to thereby find the optimal solution.

Here, the surrogate function ($J_t(f)$) may be set to satisfy the following two conditions. First, in the temporary frequency vector ($f^{(t)}$) yielded at the t-th iteration, the objective function (g(f)) and the surrogate function ($J_t(f)$) must contact each other. That is, the graph of the objective function (g(f)) and the graph of the surrogate function ($J_t(f)$) must match each other in the given temporary frequency vector ($f^{(t)}$).

Second, for the temporary frequency vector, the values of the surrogate function ($J_t(f)$) must be smaller than the values of the objective function (g(f)).

Thus, a surrogate function ($J_t(f)$) for approximating the objective function (g(f)) at the t-th iteration can be set as Equation 10.

$$J_t(f) = -\frac{1}{2}(f - f^{(t)})^T M_t (f - f^{(t)}) - q_t^T(f - f^{(t)}) + g(f^{(t)}), \qquad \text{[Equation 10]}$$

where f is the current frequency vector set temporarily, $f^{(t)}$ represents the iterative frequency vector corresponding to the objective function (g(f)) at the t-th iteration, $M_t$ represents a matrix coefficient expressing a second-order term, and $q_t$ represents a vector coefficient expressing a first-order term.

Finally, the next iterative frequency vector ($f^{(t+1)}$) that maximizes the surrogate function ($J_t(f)$) may be determined as Equation 11.

$$f^{(t+1)} = \mathcal{P}(f^{(t)} - M_t^{-1} q_t), \qquad \text{[Equation 11]}$$

where $f^{(t+1)}$ represents the iterative frequency vector contacting the objective function (g(f)) at the (t+1)-th iteration, $\mathcal{P}(\bullet)$ represents an operator for orthogonally projecting the elements of the iterative frequency vector ($f^{(t+1)}$) to within the frequency range ($[f_L,\ f_U]$).

The iterative frequency vector ($f^{(t+1)}$) determined by Equation 11 can be applied again to Equation 10 for the next iteration. That is, the iterative frequency vector ($f^{(t+1)}$) obtained by Equation 11 may be updated to an iterative frequency vector contacting the objective function (g(f)) in the next iteration.

Due to Equation 11, the updated iterative frequency vector ($f^{(t+1)}$) may yield a larger value than the iterative temporary frequency vector ($f^{(t)}$) in the objective function (g(f)), i.e., $g(f^{(t+1)}) \geq g(f^{(t)})$. In other words, through iterative searching, an iterative frequency vector ($f^{(t+1)}$) can be obtained that satisfies Equation 9.

If the difference between the updated iterative frequency vector ($f^{(i,t+1)}$) and the previous iterative frequency vector ($f^{(i,t)}$) is within a pre-designated reference frequency difference ($\varepsilon$), i.e., if $|f^{(i,t+1)} - f^{(i,t)}| \leq \varepsilon$, the beamforming unit 120 may set the updated iterative frequency vector ($f^{(i,t+1)}$) as the (i+1)-th temporary frequency vector and perform another iteration based on the set (i+1)-th temporary frequency vector ($f^{(i+1)}$) to obtain an (i+1)-th beamforming vector ($w^{(i+1)}$) according to Equation 8. Then, with the (i+1)-th beamforming vector ($w^{(i+1)}$) thus obtained, the amounts of energy ($Q_k^{(i+1)}$) harvested at the multiple receiver apparatuses respectively may be calculated and added to obtain the total harvested energy, which may be calculated as in Equation 7 as the total sum ($\Sigma Q_k^{(i+1)}$) of the harvested energy amounts ($Q_1^{(i+1)} \sim Q_K^{(i+1)}$). Then, it may be determined whether or not the difference between the calculated total harvested energy ($\Sigma Q_k^{(i+1)}$) and the previously calculated total harvested energy ($\Sigma Q_k^{(i)}$) is within a pre-designated reference harvested energy difference ($\delta$), i.e., whether or not $|\Sigma Q_k^{(i+1)} - \Sigma Q_k^{(i)}| \leq \delta$. If the difference between the calculated total harvested energy ($\Sigma Q_k^{(i+1)}$) and the previously calculated total harvested energy ($\Sigma Q_k^{(i)}$) is greater than the reference harvested energy difference ($\delta$), then the previously obtained (i+1)-th temporary frequency vector may be used again as the initial iterative frequency vector ($f^{(i+1,0)}$) and an iterative update may be performed according to Equation 11 based on a surrogate function ($J_t(f)$) so that the temporary frequency vector ($f^{(i+2,t+1)}$) may be within the pre-designated reference frequency difference ($\varepsilon$), and a beamforming vector ($w^{(i+2)}$) may be obtained based on the finally updated temporary frequency vector ($f^{(i+2,t+1)}$) to calculate the total harvested energy ($\Sigma Q_k^{(i+2)}$).

However, if the difference between the calculated total harvested energy ($\Sigma Q_k^{(i+1)}$) and the previously calculated total harvested energy ($\Sigma Q_k^{(i)}$) is within the reference harvested energy difference (δ), then the temporary frequency vector ($f^{(i+1)}$) and beamforming vector ($w^{(i+1)}$) applied to the current total harvested energy ($\Sigma Q_k^{(i+1)}$) may be applied as the parameters for beamforming the signals supplied to the multiple antennas with which the transmitter apparatus 100 performs the wireless power transmission. This may allow the transmitter apparatus 100 to form a multi-lobe beam that achieves a near maximum power efficiency in consideration of the efficiency of the calculation.

That is, a wireless power transmitter apparatus 100 according to this embodiment can calculate the frequency vector ($f^{(i+1,t+1)}$) and the beamforming vector ($w^{(i+1)}$) and transmit wireless power signals to the multiple receiver apparatuses 200 by forming a multi-lobe beam based on the calculated frequency vector ($f^{(i+1,t+1)}$) and beamforming vector ($w^{(i+1)}$), so as to enable the array antenna having multiple antennas to transmit wireless power to the receiver apparatuses 200 with maximum power efficiency.

Figure 5:
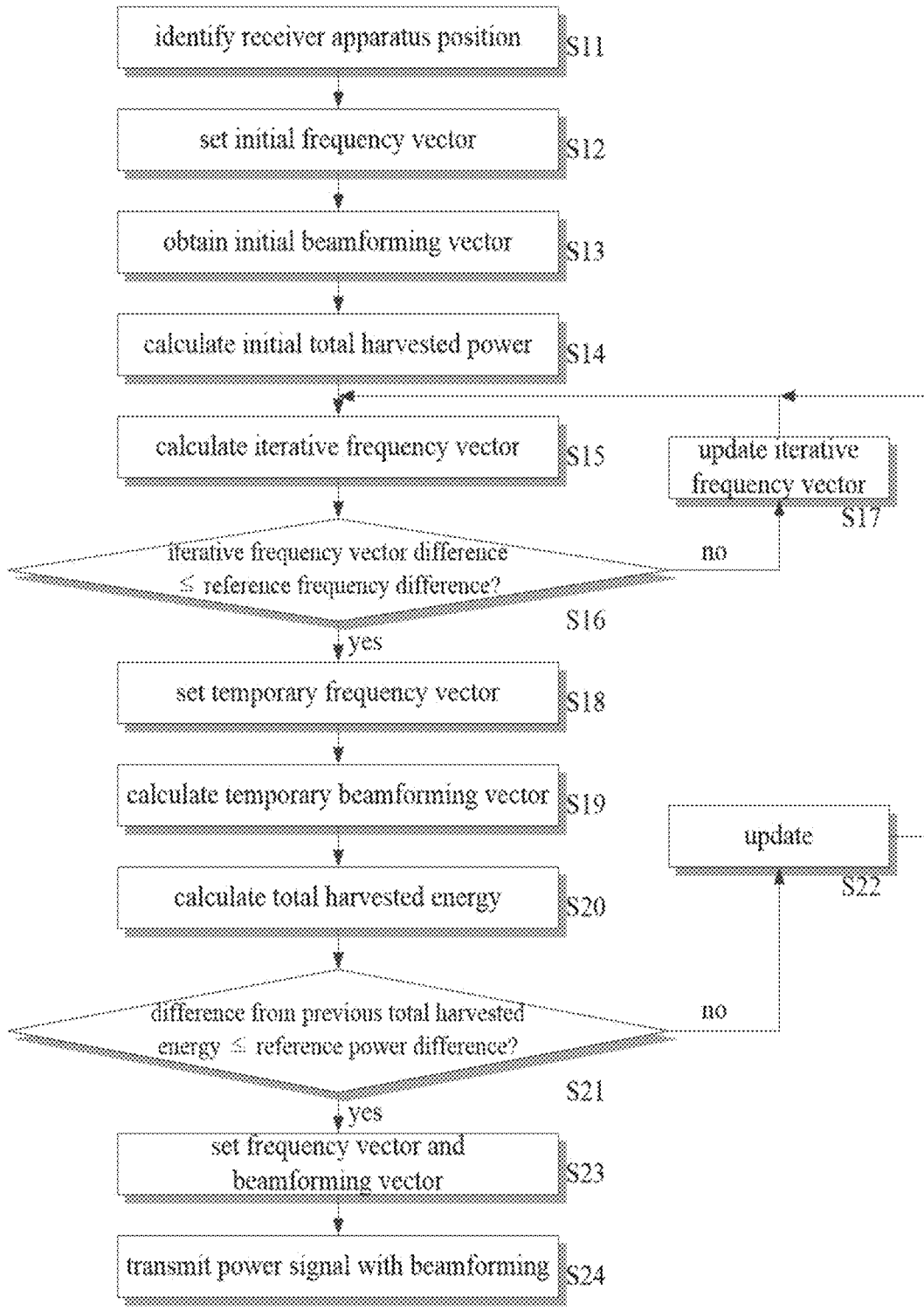
FIG. 5 illustrates a transmission method for a wireless power transmission system according to an embodiment of the present disclosure.

FIG. 5 illustrates a transmission method for a wireless power transmission system according to an embodiment of the present disclosure.

Describing the transmission method for a wireless power transmission system shown in FIG. 5 with reference to FIG. 3 and FIG. 4, the transmitter apparatus 100 may first identify the positions of a multiple receiver apparatuses that are arranged within the service area and require transmissions of wireless power signals (operation S11). Then, an initial temporary frequency vector ($f^{(0)}$) may be set, which includes as its elements the frequencies of the signals that are to be transmitted through the multiple antennas respectively to the multiple receiver apparatuses (operation S12). Here, the initial temporary frequency vector ($f^{(0)}$) can be set to a pre-designated frequency or an arbitrary frequency within a pre-designated frequency range ([$f_L$, $f_U$]). Based on the initial temporary frequency vector ($f^{(0)}$) thus set, an initial beamforming vector ($w^{(0)}$) may be obtained from Equation 8 (operation S13). When the initial frequency vector ($f^{(0)}$) and the initial beamforming vector ($w^{(0)}$) have been obtained, then the initial total harvested energy ($\Sigma Q_k^{(0)}$) may be calculated according to Equations 6 and 7 (operation S14).

Afterwards, based on the frequency vector ($f^{(i)}$) and beamforming vector ($w^{(i)}$) obtained at a previous i-th iteration (where i={0, 1, 2, . . . }), a (t+1)-th iterative frequency vector ($f^{(i+1,t+1)}$) (where t={0, 1, 2, . . . }) for the (i+1)-th frequency vector ($f^{(i+1)}$) may be calculated according to Equation 11 by using the surrogate function ($J_r(f)$) of Equation 10 (operation S15). Here, the 0-th initial iterative frequency vector ($f^{(i+1, 0)}$) for the (i+1)-th frequency vector ($f^{(i+1)}$) may be the temporary frequency vector obtained at the previous i-th iteration.

Then, it may be determined whether or not the difference between the currently calculated (t+1)-th iterative frequency vector ($f^{(i+1,t+1)}$) and the previously calculated t-th iterative frequency vector ($f^{(i+1,t)}$) is within a pre-designated reference frequency difference (ε), i.e., whether or not |$f^{(i,t+1)}$−$f^{(i+1,t)}$|≤ε (operation S16). If the difference between the (t+1)-th iterative frequency vector ($f^{(i+1,t+1)}$) and the previously calculated t-th iterative frequency vector ($f^{(i+1,t)}$) is greater than the reference frequency difference (ε), then the currently obtained (t+1)-th temporary frequency vector ($f^{(i+1,t+1)}$) may be updated as the frequency vector (f) for obtaining the next (t+2)-th iterative frequency vector ($f^{(i+1,t+2)}$) (operation S17).

However, if the difference between the (t+1)-th iterative frequency vector ($f^{(i+1,t+1)}$) and the previously calculated t-th iterative frequency vector ($f^{(i+1,t)}$) is within the pre-designated reference frequency difference (ε), then the iterations may be stopped, and the currently calculated iterative frequency vector ($f^{(i+1,t+1)}$) may be set as the temporary frequency vector ($f^{(i+1)}$) (operation S18).

By calculating Equation 8 based on the temporary frequency vector ($f^{(i+1)}$) set thus, a temporary beamforming vector ($w^{(i+1)}$) may be calculated (operation S19). When the temporary beamforming vector ($w^{(i+1)}$) is calculated, the total harvested energy ($\Sigma Q_k^{(i+1)}$) may be calculated again according to Equations 6 and 7 based on the temporary frequency vector ($f^{(i+1)}$) and the temporary beamforming vector ($w^{(i+1)}$) (operation S20).

Then, it may be determined whether or not the difference between the calculated total harvested energy ($\Sigma Q_k^{(i+1)}$) and the previous total harvested energy ($\Sigma Q_k^{(i)}$) is within a pre-designated reference harvested energy difference (δ), i.e., whether or not |$\Sigma Q_k^{(i+1)}$−$\Sigma Q_k^{(i)}$|≤δ (operation S21). If the difference in total harvested energy values (|$\Sigma Q_k^{(i+1)}$−$\Sigma Q_k^{(i)}$|) is greater than the reference harvested energy difference (δ), then the previously calculated temporary frequency vector ($f^{(i)}$) and temporary beamforming vector ($w^{(i)}$) may be updated to the currently calculated temporary frequency vector ($f^{(i+1)}$) and temporary beamforming vector ($w^{(i+1)}$) (operation S22). Then, using the updated temporary frequency vector ($f^{(i+1)}$) as the initial iterative frequency vector ($f^{(i+2, 0)}$) for obtaining the (i+2)-th temporary frequency vector ($f^{(i+2)}$), a temporary frequency vector ($f^{(i+2, t+1)}$) may be calculated iteratively according to Equation 11 based on a surrogate function ($J_r(f)$) (operation S15).

However, if the difference in total harvested energy values (|$\Sigma Q_k^{(i+1)}$−$\Sigma Q_k^{(i)}$|) is within the reference harvested energy difference (δ), then the currently calculated temporary frequency vector ($f^{(i+1)}$) and temporary beamforming vector ($w^{(i+1)}$) may be set as the frequency vector (f) and beamforming vector (w) that are to be applied to the multiple antennas of the signal transmitter unit 130 of the transmitter apparatus 100 (operation S23). Then, according to the frequency vector (f) and beamforming vector (w) set thus, signals having pre-designated frequencies and gains and phases may be supplied respectively to the multiple antennas of the signal transmitter unit 130, and the transmission signals may be transmitted with multi-lobe beamforming (operation S24).

Figure 6:
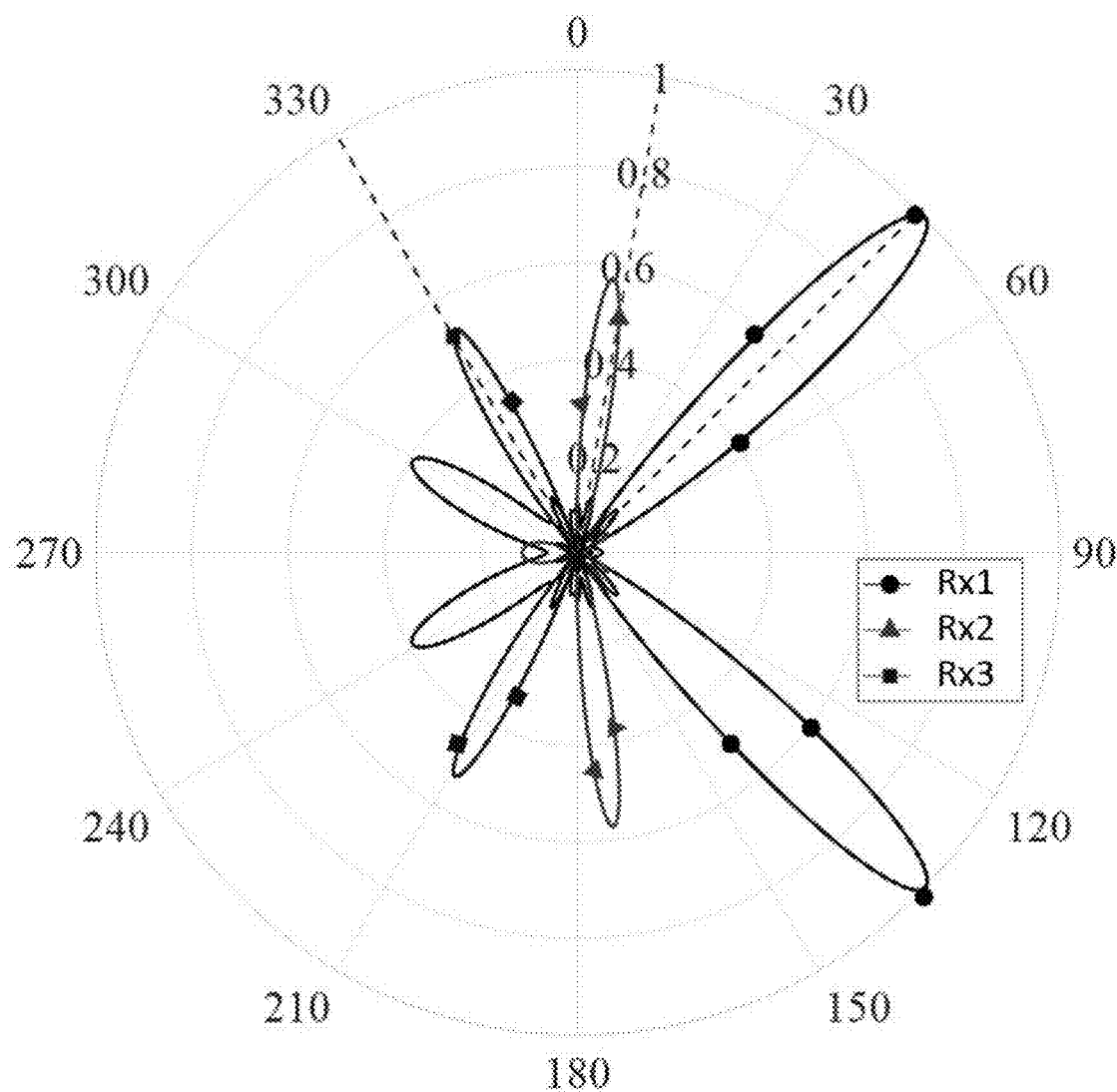
FIG. 6 illustrates an example of a beam pattern of a wireless power signal according to an embodiment of the present disclosure.

FIG. 6 illustrates an example of a beam pattern of a wireless power signal obtained according to this embodiment.

Figure 2:
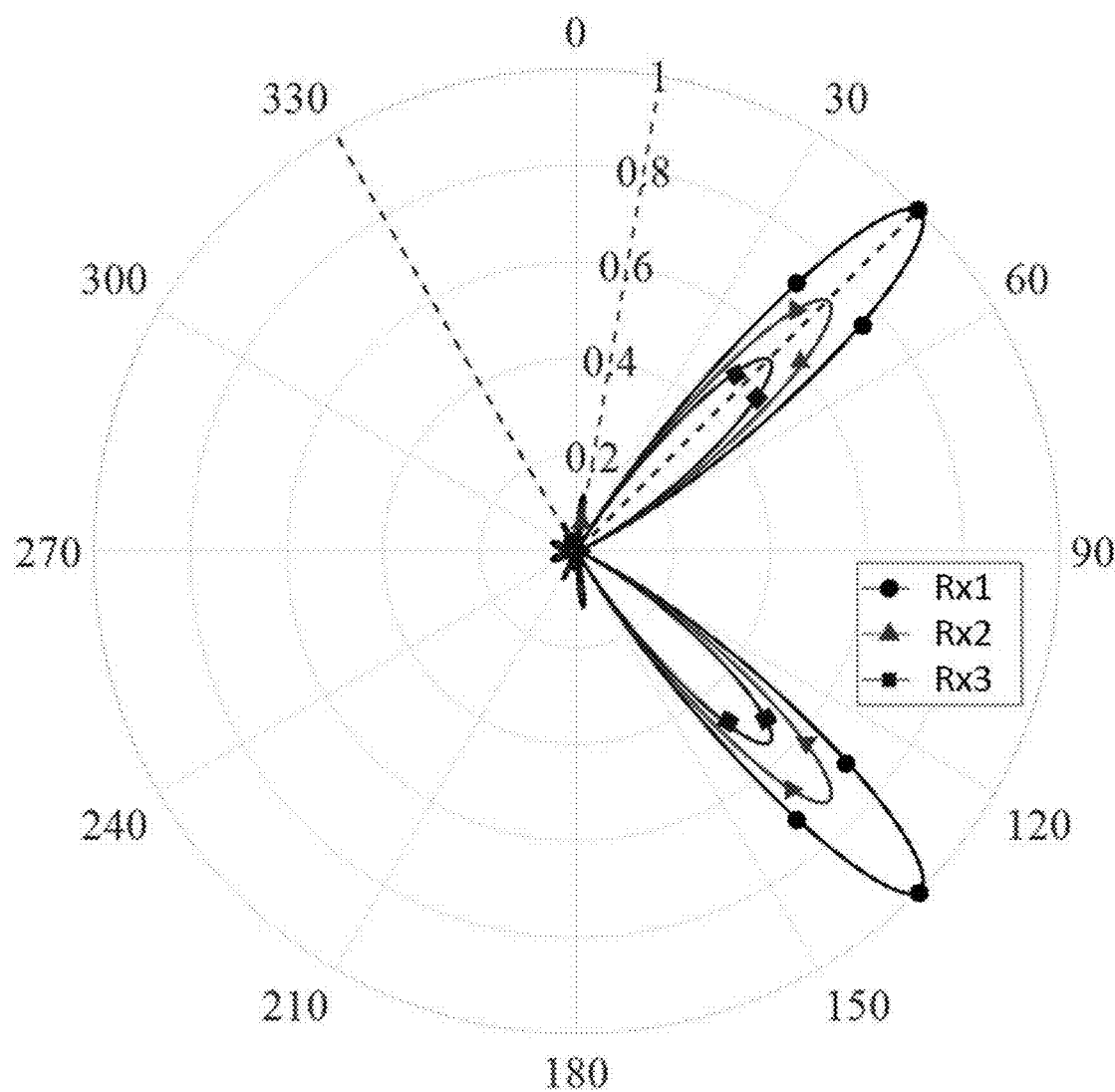
FIG. 2 illustrates an example of a beam pattern of a wireless power signal provided according to a conventional beamforming technique.

Similarly to FIG. 2, FIG. 6 also illustrates an example of transmitting wireless power to a first to third receiver apparatus Rx1~Rx3 that are arranged at increasingly farther distances from the transmitter apparatus. Comparing the beam pattern of FIG. 6 with the beam pattern of FIG. 2, the three receiver apparatuses Rx1~Rx3 in FIG. 2 are positioned in different directions with respect to the transmitter apparatus, and the beam pattern is formed to accommodate only the first receiver apparatus Rx1 that is located closest, so that the power transmission efficiency is very low for the second and third receiver apparatuses Rx2, Rx3. In contrast, the transmitter apparatus according to the embodiment illustrated in FIG. 6 can form a multi-lobe beam pattern in the directions of the three receiver apparatuses Rx1~Rx3 to provide a power transmission efficiency that is improved over the example of FIG. 2.

Here also, the portion of the beam pattern that is symmetrical about the 90 degree angle to the beam pattern directed at the three receiver apparatuses Rx1~Rx3 is formed due to the assumption that the multiple antennas of the transmitter apparatus have a linearly arrayed structure.

Figure 7:
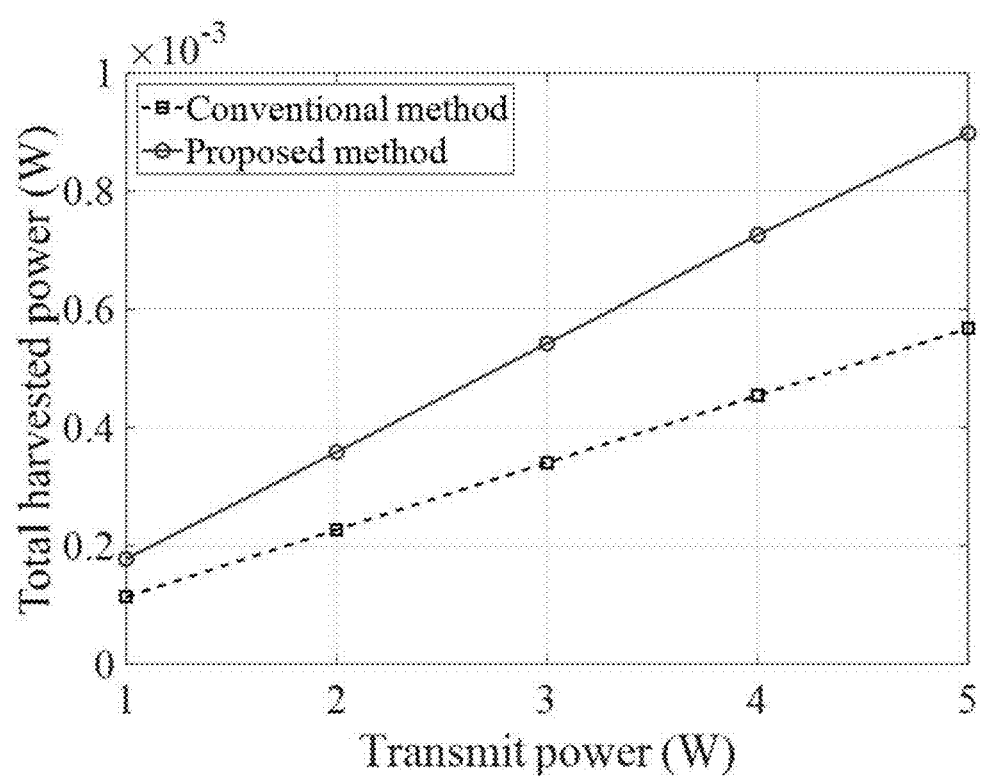
FIG. 7 is a graph comparing the power transmission efficiency obtained by a conventional method with the power transmission efficiency obtained by a method proposed as an embodiment of the present disclosure.

FIG. 7 is a graph comparing the power transmission efficiency obtained by a conventional method with the power transmission efficiency obtained by a method according to the present embodiment.

FIG. 7 shows the total amounts of harvested energy ($\Sigma Q_k$) collected at the multiple receiver apparatuses when the transmitter apparatus transmits wireless power using the beam patterns of FIG. 2 and FIG. 6. From FIG. 7 it can be seen that, when wireless power signals are transmitted via a multi-lobe beam pattern formed in the directions of the multiple receiver apparatuses using the wireless power transmission method of this embodiment, the total amount of harvested energy ($\Sigma Q_k$) can be increased compared to the conventional transmission method that forms a beam pattern only in the direction of a single closest receiver apparatus. That is, the power transmission efficiency can be greatly improved.

A method provided by an embodiment of the present disclosure can be implemented in the form of program instructions that may be stored in a medium for execution by a computer. Here, such a computer-readable medium can be an arbitrary available medium accessible by a computer and can also include any type of a computer storage medium. Examples of a computer storage medium can include volatile and non-volatile, detachable and non-detachable media implemented by any method or technology for storing information such as computer-readable commands, data structures, program modules, and other data and can include ROM (read-only memory), RAM (random access memory), CD-ROM's, DVD-ROM's, magnetic tapes, floppy disks, optical data storage devices, etc.

While the present disclosure is described above with reference to the illustrated embodiments, these are provided merely as examples, and the person having ordinary skill in the art would understand that numerous variations and other equivalent embodiments can be derived from the above.

Therefore, the true scope of protection of the present disclosure is to be defined by the technical spirit set forth in the appended claims.

What is claimed is:

1. A transmitter apparatus for a wireless power transmission system, the transmitter apparatus comprising:

a receiver position identifier unit configured to determine positions of a plurality of receiver apparatuses;

a signal transmitter unit comprising a plurality of antennas arrayed in a pre-designated pattern, the signal transmitter unit configured to radiate wireless power signals by forming a beam in a pattern corresponding to signals supplied respectively to the plurality of antennas; and a beamforming unit configured to improve a wireless power transmission efficiency by temporarily setting a frequency vector and a beamforming vector based on the positions of the plurality of receiver apparatuses and alternatingly iteratively estimating the other vector to enhance power transmission efficiency such that a multi-lobe beam pattern radiated simultaneously in directions of the plurality of receiver apparatuses is formed in the plurality of antennas, the frequency vector designating frequencies of the signals supplied to the plurality of antennas, the beamforming vector designating phases and gains of the signals, wherein, if a change in total harvested energy calculated as a total sum of harvested energy amounts harvested respectively at the plurality of receiver apparatuses according to a temporary frequency vector and a temporary beamforming vector set temporarily through an alternating iterative estimation is within a pre-designated reference harvested energy difference, the beamforming unit adjusts the frequencies and the phases and gains of the signals supplied to the plurality of antennas according to a currently set temporary frequency vector and temporary beamforming vector, wherein the beamforming unit, upon obtaining a temporary frequency vector, calculates a downlink channel between the transmitter apparatus and each of the plurality of receiver apparatuses and calculates the temporary beamforming vector based on the calculated downlink channels and energy conversion efficiencies of the plurality of receiver apparatuses, and wherein the beamforming unit calculates a LOS (line-of-sight) component of a downlink channel ($h_k$) between the transmitter apparatus and a k-th receiver apparatus from among the plurality of receiver apparatuses according to a following equation:

$$\bar{h}_k = \sqrt{\frac{1}{N}} \left[ 1, e^{j2\pi(f_2\tau_{k,2} - f_1\tau_{k,1})}, \ldots, e^{j2\pi(f_N\tau_{k,N} - f_1\tau_{k,1})} \right]^T,$$

where $f_n$ represents a frequency of a signal supplied to an n-th antenna from among an N number of antennas, and $\tau_{k,n}$ represents a time delay between the n-th antenna and a k-th receiver apparatus, and calculates the downlink channel ($h_k$) as:

$$h_k = \sqrt{\frac{\beta_k R}{1+R}} \bar{h}_k + \sqrt{\frac{\beta_k}{1+R}} \tilde{h}_k,$$

where $\beta_k$ represents a large-scale fading coefficient, R represents a Rician parameter, and $\tilde{h}_k$ represents a NLOS (non-line-of-sight) component.

2. The transmitter apparatus of claim 1, wherein the beamforming unit calculates the temporary beamforming vector according to a following equation:

$$w = \sqrt{P_0}\, v_{max}(G),$$

where $P_0$ represents a maximum transmission power, G represents an energy conversion and channel efficiency and is calculated as $G = \Sigma_{k=1}^{K} \eta_k h_k h_k^H$, and $v_{max}(G)$ represents an eigenvector corresponding to a maximum of the energy conversion and channel efficiency (G).

3. The transmitter apparatus of claim 2, wherein the beamforming unit, upon obtaining the temporary beamforming vector, searches for and obtains a frequency ($f_n$) maximizing an energy conversion and beamforming channel efficiency (g(f)) within a pre-designated frequency range ($[f_L, f_U]$) according to a following equation:

$$\underset{f}{\text{maximize}} \quad g(f) = w^H G w$$
$$\text{subject to} \quad f_L \le f_n \le f_U, \forall n$$

4. The transmitter apparatus of claim 2, wherein the beamforming unit calculates and obtains an iteratively estimated frequency vector ($f^{(t+1)}$) according to a following equation:

$$f^{(t+1)} = \mathcal{P}(f^{(t)} - M_t^{-1} q_t),$$

where $f^{(t+1)}$ represents the iterative frequency vector contacting an objective function (g(f)) at a (t+1)-th iteration, and P(•) represents an operator for orthogonally projecting elements of the iterative frequency vector ($f^{(t+1)}$) to within the frequency range ([$f_L$, $f_U$]),
so as to maximize a surrogate function ($J_t(f)$) expressed as:

$$J_t(f) = -\frac{1}{2}(f - f^{(t)})^T M_t (f - f^{(t)}) - q_t^T(f - f^{(t)}) + g(f^{(t)}),$$

where f is a current temporarily set frequency vector, $f^{(t)}$ represents an iterative frequency vector corresponding to the objective function (g(f)) at a t-th iteration, $M_t$ represents a matrix coefficient expressing a second-order term, and $q_t$ represents a vector coefficient expressing a first-order term.

5. The transmitter apparatus of claim 4, wherein the beamforming unit iteratively obtains an iterative frequency vector until a difference between an iterative frequency vector obtained at a current iteration and an iterative frequency vector obtained at a previous iteration is within a pre-designated reference frequency difference ($\varepsilon$) and, if the difference between the iterative frequency vectors is within the reference frequency difference ($\varepsilon$), sets the currently obtained iterative frequency vector as the temporary frequency vector.

6. The transmitter apparatus of claim 4, wherein the beamforming unit calculates an amount of harvested energy at each of the plurality of receiver apparatuses according to a following equation:

$$Q_k = \eta_k \mathbb{E}\{|y_k|\}^2 = \eta_k (|h_k^H w|^2 + \sigma_k^2),$$

where $Q_k$ represents an amount of harvested energy at a k-th receiver apparatus, $\eta_k$ represents a rectifier energy conversion efficiency of the receiver apparatus, $\mathbb{E}$ represents an energy function, $h_k^H$ represents an Hermitian matrix of a downlink channel between the transmitter apparatus and the k-th receiver apparatus, w represents the beamforming vector, and $\sigma_k^2$ represents a variance of antenna noise $n_k$.

7. A transmission method for a transmitter apparatus of a wireless power transmission system, the wireless power transmission system comprising a plurality of antennas arrayed in a pre-designated pattern and configured to apply beamforming on wireless power signals and transmit the wireless power signals to a plurality of receiver apparatuses, the transmission method comprising:

determining positions of the plurality of receiver apparatuses;
estimating a frequency vector and a beamforming vector by temporarily setting the frequency vector and the beamforming vector based on the positions of the plurality of receiver apparatuses and alternatingly iteratively estimating the other vector to enhance power transmission efficiency such that a multi-lobe beam pattern radiated simultaneously in directions of the plurality of receiver apparatuses is formed in the plurality of antennas, the frequency vector designating frequencies of the signals supplied to the plurality of antennas, the beamforming vector designating phases and gains of the signals; and
radiating the wireless power signals by forming a beam in a pattern according to signals supplied respectively to the plurality of antennas in correspondence to the estimated beamforming vector and frequency vector,
wherein the estimating comprises:
determining whether or not a change in total harvested energy is within a pre-designated reference harvested energy difference, the change in total harvested energy calculated as a total sum of harvested energy amounts harvested respectively at the plurality of receiver apparatuses according to a temporary frequency vector and a temporary beamforming vector set temporarily through an alternating iterative estimation; and
setting a currently set temporary frequency vector and temporary beamforming vector as the frequency vector and beamforming vector for adjusting the frequencies and the phases and gains of the signals supplied to the plurality of antennas, if it is determined that the change in total harvested energy is within the pre-designated reference harvested energy difference,
wherein the determining comprises:
calculating downlink channels between the transmitter apparatus and the plurality of receiver apparatuses respectively from a previously obtained temporary frequency vector;
calculating the temporary beamforming vector based on the calculated downlink channels and energy conversion efficiencies of the plurality of receiver apparatuses;
obtaining a temporary frequency vector in a pre-designated manner by using the temporary beamforming vector;
calculating the total harvested energy by calculating and summing the harvested energy amounts harvested respectively by the plurality of receiver apparatuses; and
calculating a difference between a previously calculated total harvested energy and a currently calculated total harvested energy, and
wherein the calculating of the downlink channels comprises:
calculating a LOS (line-of-sight) component of a downlink channel ($h_k$) between the transmitter apparatus and a k-th receiver apparatus from among the plurality of receiver apparatuses according to a following equation:

$$\bar{h}_k = \sqrt{\frac{1}{N}} \left[1, e^{j2\pi(f_2 \tau_{k,2} - f_1 \tau_{k,1})}, \dots, e^{j2\pi(f_N \tau_{k,N} - f_1 \tau_{k,1})}\right]^T$$

where $f_n$ represents a frequency of a signal supplied to an n-th antenna from among an N number of antennas, and $\tau_{k,n}$ represents a time delay between the n-th antenna and a k-th receiver apparatus; and calculating the downlink channel ($h_k$) as:

$$h_k = \sqrt{\frac{\beta_k R}{1+R}} \bar{h}_k + \sqrt{\frac{\beta_k}{1+R}} \tilde{h}_k,$$

where $\beta_k$ represents a large-scale fading coefficient, R represents a Rician parameter, and $\tilde{h}_k$ represents a NLOS (non-line-of-sight) component.

8. The transmission method of claim 7, wherein the calculating of the temporary beamforming vector comprises:
obtaining the temporary beamforming vector according to a following equation:

$$w = \sqrt{P_0}\, v_{max}(G),$$

where $P_0$ represents a maximum transmission power, G represents an energy conversion and channel efficiency and is calculated as $G = \sum_{k=1}^{K} \eta_k h_k h_k^H$, and $v_{max}(G)$ represents an eigenvector corresponding to a maximum of the energy conversion and channel efficiency (G).

9. The transmission method of claim 8, wherein the obtaining of the temporary frequency vector comprises:
searching for and obtaining a frequency ($f_n$) maximizing an energy conversion and beamforming channel efficiency (g(f)) within a pre-designated frequency range ([$f_L$, $f_U$]) according to a following equation, upon obtaining the temporary beamforming vector:

$$\begin{array}{ll} \underset{f}{\text{maximize}} & g(f) = w^H G w \\ \text{subject to} & f_L \leq f_n \leq f_U, \forall\, n \end{array}.$$

10. The transmission method of claim 8, wherein the obtaining of the temporary frequency vector comprises:
obtaining an iteratively estimated frequency vector ($f^{(t+1)}$) according to a following equation:

$$f^{(t+1)} = \mathcal{P}(f^{(t)} - M_t^{-1} q_t),$$

where $f^{(t+1)}$ represents the iterative frequency vector contacting an objective function (g(f)) at a (t+1)-th iteration, and P(•) represents an operator for orthogonally projecting elements of the iterative frequency vector ($f^{(t+1)}$) to within the frequency range ([$f_L$, $f_U$]), so as to maximize a surrogate function ($J_t(f)$) expressed as:

$$J_t(f) = -\frac{1}{2}(f - f^{(t)})^T M_t (f - f^{(t)}) - q_t^T (f - f^{(t)}) + g(f^{(t)}),$$

where f is a current temporarily set frequency vector, $f^{(t)}$ represents an iterative frequency vector corresponding to the objective function (g(f)) at a t-th iteration, $M_t$ represents a matrix coefficient expressing a second-order term, and $q_t$ represents a vector coefficient expressing a first-order term.

11. The transmission method of claim 10, wherein the obtaining of the temporary frequency vector comprises:
iteratively obtaining an iterative frequency vector until a difference between an iterative frequency vector obtained at a current iteration and an iterative frequency vector obtained at a previous iteration is within a pre-designated reference frequency difference ($\varepsilon$) and, if the difference between the iterative frequency vectors is within the reference frequency difference ($\varepsilon$), setting the currently obtained iterative frequency vector as the temporary frequency vector.

12. The transmission method of claim 8, wherein the calculating of the total harvested energy comprises:
calculating an amount of harvested energy at each of the plurality of receiver apparatuses according to a following equation:

$$Q_k = \eta_k \mathbb{E}\{|y_k|\}^2 = \eta_k(|h_k^H w|^2 + \sigma_k^2),$$

where $Q_k$ represents an amount of harvested energy at a k-th receiver apparatus, $\eta_k$ represents a rectifier energy conversion efficiency of the receiver apparatus, $\mathbb{E}$ represents an energy function, $h_k^H$ represents an Hermitian matrix of a downlink channel between the transmitter apparatus and the k-th receiver apparatus, w represents the beamforming vector, and $\sigma_k^2$ represents a variance of antenna noise $n_k$.

\* \* \* \* \*